United States Patent [19]

Yano et al.

[11] 4,175,837

[45] Nov. 27, 1979

[54] ELECTROCHROMIC DISPLAY CELL

[75] Inventors: Kohzo Yano; Yasuhiko Inami, both of Tenri; Hisashi Uede, Yamatokoriyama, all of Japan

[73] Assignee: Sharp Kabushiki Kaisha, Osaka, Japan

[21] Appl. No.: 877,884

[22] Filed: Feb. 15, 1978

[30] Foreign Application Priority Data

Feb. 17, 1977 [JP] Japan ................... 52-16933

[51] Int. Cl.² ................ G02F 1/17; G02F 1/23
[52] U.S. Cl. .................... 350/357; 252/408
[58] Field of Search .................. 350/357; 252/408

[56] References Cited

U.S. PATENT DOCUMENTS

| | | | |
|---|---|---|---|
| 3,704,057 | 11/1972 | Beecle | 350/357 |
| 3,708,220 | 1/1973 | Meyers et al. | 350/357 |
| 3,712,709 | 1/1973 | Kenworthy | 350/357 |
| 3,998,525 | 12/1976 | Giglia | 350/357 |
| 4,059,341 | 11/1977 | Zeller | 350/357 |
| 4,076,386 | 2/1978 | Giglia | 350/357 |
| 4,088,392 | 5/1978 | Meyers | 350/357 |
| 4,110,259 | 8/1978 | Sichel | 350/357 |
| 4,123,841 | 11/1978 | Yano et al. | 350/357 |

FOREIGN PATENT DOCUMENTS 2643678  3/1977 Fed. Rep. of Germany ........... 350/357

Primary Examiner—Benjamin R. Padgett
Assistant Examiner—T. S. Gron
Attorney, Agent, or Firm—Birch, Stewart, Kolasch and Birch

[57] ABSTRACT

An electrochromic display cell comprising a display electrode coated with a $WO_3$ film, and an electrolyte disposed in the electrochromic display cell as an ion source. The electrolyte comprises γ-Butyrolactone mixed with $LiClO_4$, $NaClO_4$ or $LiBF_4$. The $WO_3$ film is formed on the display electrode under the condition where the substrate is heated up to 250° C. through 400° C.

9 Claims, 3 Drawing Figures

ELECTROCHROMIC DISPLAY CELL

BACKGROUND OF THE INVENTION

The present invention relates to an electro-optical display containing an electrochromic material which manifests reversible variations in their light absorption properties upon application of properly controlled voltage or current. This display is referred to as an "electrochromic display (ECD)" hereinafter.

The present invention relates, more particularly, to an electrochromic display cell which employs a thin film of amorphous tungsten ($WO_3$) as an electrochromic material, and a liquid electrolyte as an ion source.

[DESCRIPTION OF PRIOR ART]

Electrochromic materials which manifest reversible variations in their light absorption properties upon application of properly controlled electric energy are well known in the art. Examples were disclosed in Talmey, U.S. Pat. No. 2,319,765 and Deb et al, U.S. Pat. No. 3,521,941.

Such electrochromic materials can be shaped in a desired pattern to display desired characters, symbols and patterns by reversibly selecting the light absorption properties through the use of electrical control. Examples were disclosed in U.S. Pat. No. 1,068,744 and the above-mentioned Deb et al, U.S. Pat. No. 3,521,941. There are three types of ECD cells using transition metal oxides. The first one is the liquid type which includes a liquid electrolyte mixed with coloration materials (Jones et al, U.S. Pat. No. 3,283,656). The second type includes an inorganic insulation film as the ion permeable insulator (the above-mentioned Deb et al, U.S. Pat. No. 3,521,941). The last type includes solid state electrolytic materials (Castellion et al, U.S. Pat. No. 3,721,710). The electrochromic display cell of the present invention relates to the type which employs the liquid electrolyte as an ion source.

Various basic structures of an electrochromic display cell of the liquid electrolyte type have been proposed. Electrochromic materials are well known in the art, as already discussed above, and disclosed in, for example, the above-mentioned Talmey, U.S. Pat. No. 2,319,765 and Deb et al, U.S. Pat. No. 3,521,941. Preferable materials are a thin film of amorphous tungsten ($WO_3$), and a film of amorplous molybdenum oxide ($MoO_3$) as disclosed in M.D. Meyers et al, U.S. Pat. No. 3,708,220.

Display electrodes of the seven-segmented type for displaying numeral information were disclosed in R. D. Giglia et al, U.S. Pat. No. 3,827,784, wherein the $WO_3$ film is formed on the display electrode comprising a $SnO_2$ film doped with $As_2O_5$. The technique for protecting the edge portion of the electrochromic layer formed on the display electrode through the use of an insulation layer was disclosed in Eric Saurer, U.S. Pat. No. 3,836,229. The technique for covering lead electrode portions with an insulation film was proposed in J. Bruinink, Pro. Sym. Sept. 29–30, 1975 at Brown Boveri Res.

A counter electrode comprising a graphite plate or a stainless steel plate coated with an electrochromic material was disclosed in R. D. Giglia et al, U.S. Pat. No. 3,819,252, and Witzke et al, U.S. Pat. No. 3,840,287.

The background of the display is formed by adding pigment to the liquid electrolyte (the above-mentioned R. D. Gilglia et al, U.S. Pat. No. 3,819,252), or by disposing an opaque plate, through which ions can travel, behind the display electrode (R. D. Giglia, U.S. Pat. No. 3,892,472).

Examples of the liquid electrolyte were disclosed in L. C. Beegle, U.S. Pat. No. 3,704,057.
  (i) sulfuric acid aqueous solutions ranging in concentration from 0.1 to 12.0 molar
  (ii) sulfuric acid solutions of propylene carbonate, acetonitrile, dimethylformamide and other organic solvents
  (iii) strong organic acid such as 2-toluene sulfuric acid in propylene carbonate and other organic solvents
  (iv) alkali metals, alkali-earth metals or rare-earth metals, such as lithium perchlorate, lithium nitrate, lithium chlorate and lithium sulfate in organic solvent such as acetonitrile and propylene carbonate.

A semi-solid conductive electrolyte was disclosed in the above-mentioned M. D. Meyers et al, U.S. Pat. No. 3,708,220. The electrolyte comprises sulfuric acid and gelling agents such as polyvinyl alcohol, polyacryl amide, ethylene glycol, sodium silicate and carbo-sil. Especially, the polyvinyl alcohol/sulfuric acid shows preferable characteristic. U.S. Pat. No. 3,708,220 also says that the viscosity and the vapor pressure of the above-mentioned gel can be properly controlled by adding dimethylformamide, acetonitrile, propionitrile, butyrolactone or glycerin.

Another example of the semi-solid conductive electrolyte was proposed in U.S. Pat. application Ser. No. 41,153 (1970) filed by D. J. Berets et al. The electrolyte comprises a mixture of greasy lithium stearate, 2-toluene sulfuric acid and propylene carbonate.

The above-mentioned electrolytes have various problems. The largest problem is that the $WO_3$ film is soluble in the electrolyte and the $WO_3$ film is deteriorated by the electrolyte, for example, the transparency of the $WO_3$ film is decreased.

When the electrolyte comprises the sulfuric acid or the organic acid, the $WO_3$ film dissolves in the electrolyte when the cell is maintained at 80° C. for seventy-two hours. Moreover, the hydrogen over potential of the proton in the aqueous solutions or the organic solutions is about 1.5V. Therefore, the system must be driven by a voltage below 1.5V. Accordingly, the acid electrolyte is not suited for ensuring the accurate operation of the electrochromic display device.

When the electrolyte comprises alkali metals, alkali-earth metals or rare-earth metals in the organic solvent, the above-mentioned problems are fairly improved. However, the possibility of the solution of the $WO_3$ film still remains.

In the above-mentioned U.S. Pat. No. 3,704,057, the electrolyte comprising lithium perchlorate ($LiClO_4$) in acetonitrile was disclosed. However, this electrolyte is not suited for the practical use, since acetonitrile boils at 79° C. The electrolyte comprising $LiClO_4$ in propylene carbonate has a wide range of tolerant temperatures, more specifically, −49.2° C. through 241.7° C. However, this electrolyte is not stable at high temperatures. More particularly, the pyrolysis occurs in the electrolyte when the cell is maintained at 80° C., and the solution changes from colorless to yellow and, moreover, the transparency of the $WO_3$ film is destroyed. Other electrolytes including propylene carbonate described in U.S. Pat. No. 3,704,057 do not show sufficient conductivity.

In the case where the electrolyte is gelled by PVA as shown in the above-mentioned U.S. Pat. No. 3,708,220, the cell is still unstable at high temperature, for example, 80° C. That is, the gelling of the electrolyte is not effective for the antisoluvation of the $WO_3$ film.

The electrolyte comprising the greasy stearate does not show high conductivity. Therefore, the responsiveness of the system is not satisfactory.

An improvement for the problems of the soluvation of the $WO_3$ film was disclosed in R. D. Giglia, U.S. Pat. No. 3,819,252, wherein the electrolyte is saturated by $WO_3$. However, this is not practical, since it is not possible that only the $WO_3$ in the electrolyte precipitates and dissolves in the electrolyte even when the temperature varies.

OBJECTS AND SUMMARY OF THE INVENTION

Accordingly, an object of the present invention is to provide an electrochromic display cell which ensures stable operations.

Another object of the present invention is to provide an electrolyte suited for an electrochromic display cell which employs a $WO_3$ film formed on a display electrode.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electrolyte utilized in the electrochromic display cell comprises γ-Butyrolactone mixed with $LiClO_4$, $NaClO_4$ or $LiBF_4$. The $WO_3$ film formed on the display electrode is so constructed as to show stability against the electrolyte. More specifically, the $WO_3$ film is formed on the display electrode under the condition where the substrate is heated up to 250° C. through 400° C.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
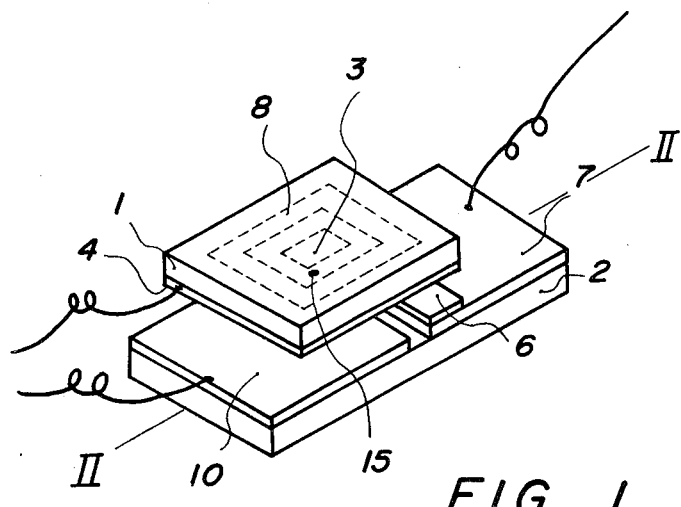
FIG. 1 is an exploded perspective view of a basic structure of an electrochromic display cell.
Figure 2:
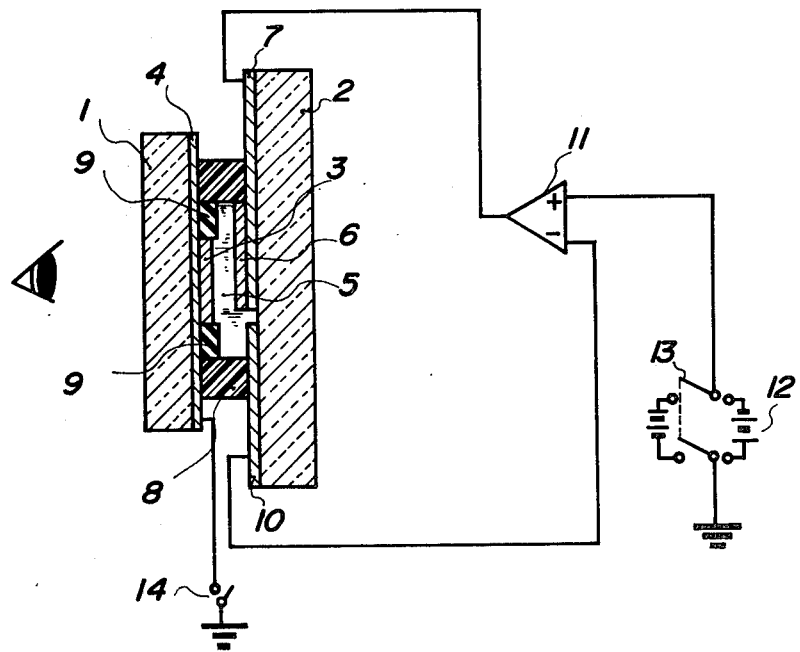
FIG. 2 is a sectional view of the electrochromic display cell as seen at II—II of FIG. 1.

FIGS. 1 and 2 show an electrochromic display cell of the liquid electrolyte type.

Two glass substrates 1 and 2 define the electrochromic display cell. An electrochromic layer 3, more specifically a $WO_3$ film, is formed on a front glass substrate 1. The $WO_3$ film 3 is formed on a transparent display electrode 4, of which an extended portion functions as a lead electrode. The transparent electrode 4 is made of $In_2O_3$ doped with $SnO_2$ and formed through the use of electron beam evaporation techniques to have a resistance of 20Ω/sq. A liquid electrolyte 5 is disposed in the cell. The liquid electrolyte 5 is mixed with pigment for creating the display background. A suitable pigment is, for example, $Al_2O_3$ powder of 15vol% through 20vol% such as "CR-0.3 μm" manufactured by Mellar Co. Ltd.

A counter electrode comprises an electrode 7 formed on a rear glass substrate 2 and an electrochromic layer 6 formed thereon. The electrode 7 is made of $In_2O_3$, and an extended portion thereof functions as a lead electrode. The electrochromic layer 6 is made of a same material as the electrochromic layer 3. The cell is sealed by a spacer 8 comprising a glass plate of 1 mm thickness and epoxy resin such as "R-2401-HC-160" manufactured by Somal Kogyo KK. An insulation layer 9 is formed on the lead electrode to protect the lead electrode from the electrolyte 5. The insulation layer 9 comprises a $SiO_2$ film formed through the use of vacuum evaporation techniques. A reference electrode 10 made of an $In_2O_3$ film is formed on the rear glass substrate 2.

The above-mentioned electrochromic display cell is driven by a driver circuit comprising a battery 12, switches 13 and 14, and a high input impedance linear amplifier 11. An opening 15 for injecting the electrolyte 5 is sealed by a sealing glass plate.

The front glass substrate 1, the electrode 4, the electrochromic layer 3 and the insulation layer 9 are transparent and, therefore, the operator observes the uniform white background when the display is in the OFF state. When the electric field is applied to the electrochromic display cell by closing the switch 14 and inclining the selection switch 13 to the positive side, the display electrode or the $WO_3$ film 3 is placed into the coloration state of blue. Conversely, when the selection switch 13 is inclined to the negative side and the switch 14 is closed, the display electrode is returned to the colorless state or the bleached state.

The electrochromic display cell of FIG. 2 is driven by the constant potential method, which is suited for the electrochromic display cell including the electrochromic layer and the liquid electrolyte.

The liquid electrolyte must show a high conductivity in order to minimize the driving voltage. Our experiments show the facts that an electric charge of 10 $mC/cm^2$ is required to produce a contrast ratio of 10:1 in the $WO_3$ film ECD against the wavelength of 590 nm. When the system is so constructed as to have a response time of 0.5 seconds, the electric current of 20 $mA/cm^2$ flows through the ECD cell. When the ECD cell has a 1 mm thickness and the conductivity of the electrolyte is $10^{-3}$ ·$cm^{-1}$, the voltage loss due to the resistance of the electrolyte can be calculated as about 2 V. Accordingly, the electrolyte must have a conductivity of $10^{-3}$ through $10^{-2}$ ·$cm^{-1}$.

Moreover, the ECD cell must be stable at a temperature ranging from −30° C. to 80° C. The electrolyte must not freeze at a low temperature, and the $WO_3$ film must not dissolve in the electrolyte and the electrolyte must not deteriorate at high temperatures.

As already discussed, strong acid is not suited for the electrolyte. The perchlorate salt or tetrafluoroborate salt of sodium or lithium shows preferred characteristics.

Figure 3:
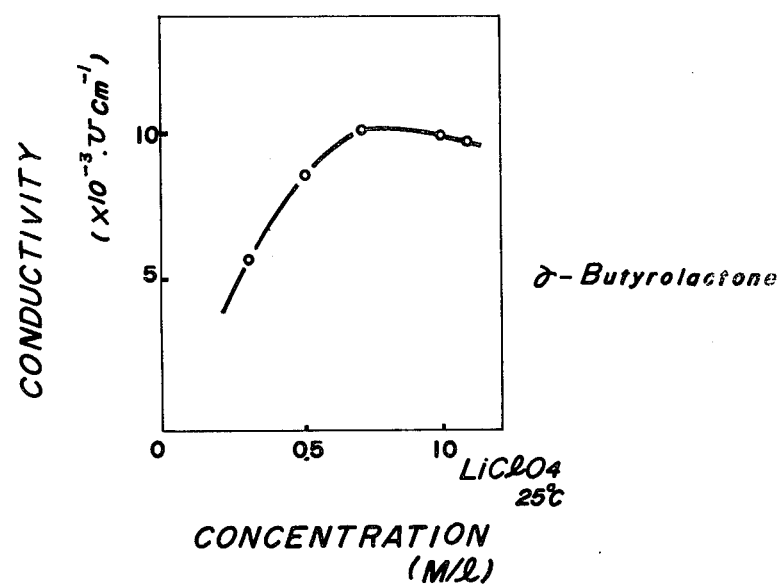
FIG. 3 is a graph showing conductivity versus concentration of $LiClO_4$ in γ-Butyrolactone characteristics of an electrolyte employed in the electrochromic display cell of the present invention.

FIG. 3 shows conductivity of the electrolyte versus concentration of lithium perchlorate in γ-Butyrolactone characteristics. The conductivity is at a maximum at a concentration of around 0.75 mol/l, and moreover the conductivity does not increase even when the concentration is increased.

The conductivity of the preferred electrolytes is shown in the following TABLE I.

film is conducted in various conditions where the substrate temperature is held at various values. The detection is carried out in a same manner as discussed above, and the device is maintained at 80° C. during the test.

TABLE I

| | (Liquid Electrolytes) | | | |
|---|---|---|---|---|
| | ELECTROLYTE *1 | TEMPERATURE (°C.) | CONDUCTIVITY *2 | SOLUVATION OF $WO_3$ *3 |
| PROPYLEN CARBONATE | $LiClO_4$ | −49.2 through 241.7 | $4.81 \times 10^{-3}$ | Δ |
| DIMETHYLFORMAMIDE | $LiClO_4$ | −61 through 153 | $23.1 \times 10^{-3}$ | X |
| N:METHYLFORMAMIDE | $LiClO_4$ | −3.8 through 182.5 | $12.7 \times 10^{-3}$ | X |
| ACETONITRILE | $LiClO_4$ | −45.7 through 81.8 | $12.2 \times 10^{-3}$ | Δ |
| γ-BUTYROLACTONE | $LiClO_4$ | −43.5 through 204 | $9.88 \times 10^{-3}$ | Δ |
| γ-BUTYROLACTONE | $LiBF_4$ | −43.5 through 204 | $8.32 \times 10^{-3}$ | |
| γ-BUTYROLACTONE | $NaClO_4$ | −43.5 through 204 | $9.35 \times 10^{-3}$ | |

*1 : concentration 1.0M/1
*2 : temperature 25° C.
*3 : the $WO_3$ film is formed in the conventional manner

TABLE II

| | (Chemical Strength of $WO_3$ Film) | | | |
|---|---|---|---|---|
| | 1.0M/1 LITHIUM PERCHLORATE | | | 1.0M/1 SULFURIC ACID |
| SUBSTRATE TEMPERATURE | γ-BUTYROLACTONE | PROPYLENE CARBONATE | N:METHYLFORMAMIDE | GLYCERIN |
| Not Heated | 100 ppm/20 days* | 73 ppm/20 days | 175 ppm/3 days | 200 ppm/8 hours |
| 100° C. | 105 ppm/30 days | 75 ppm/30 days | 110 ppm/3 days | 200 ppm/8 hours |
| 200° C. | 25 ppm/90 days | 10 ppm/90 days | 35 ppm/3 days | 150 ppm/8 hours |
| 300° C. | not appear/90 days | not appear/90 days | 10 ppm/3 days | 55 ppm/8 hours |
| 400° C. | not appear/90 days | not appear/90 days | not appear/3 days | 30 ppm/8 hours |

*The time length during which the device is maintained at 80° C.

The acetonitrile is not suited for the liquid electrolyte, since the boiling point thereof is 81.8° C. The dimethylformamide and the N:methylformamide are not suited for the liquid electrolyte, since the $WO_3$ is highly soluble in these two liquid. Moreover, the propylene carbonate deteriorates when it is maintained at 80° C. for one month. The γ-Butyrolactone with 0.7 mol/1 through 1.0 mol/1 $LiClO_4$, $LiBF_4$ or $NaClO_4$ shows the preferred heat tolerance, and the preferred conductivity. However, there is a possibility that the $WO_3$ film will dissolve in these three liquid electrolytes.

In the case where the $WO_3$ film is formed through the use of a conventional evaporation technique, the $WO_3$ film dissolves in the liquid electrolyte and the transparency of the $WO_3$ film disappears. More specifically, when the liquid electrolyte has a volume such that the concentration becomes 200 ppm upon complete dissolution of the $WO_3$ film, the concentration of tungsten, detected by the elemental analysis, such as "AA780" manufactured by Jarrell Ash Co. Ltd., is 100 ppm after the device is maintained at 80° C. for twenty days.

To strengthen the antisoluvation of the $WO_3$ film, in accordance with the present invention, the $WO_3$ film is formed on the glass substrate under the condition where the substrate is held at a high temperature. The following TABLE II shows the soluvation of the $WO_3$ film in various liquid electrolytes. The formation of the $WO_3$ It will be clear from TABLE II that the chemical strength of the $WO_3$ film is enhanced when the $WO_3$ film is formed under the condition where the substrate is held at a high temperature. Moreover, the antisoluvation of the $WO_3$ film is ensured when the electrolyte comprises γ-Butyrolactone or propylene carbonate.

The increase of the chemical strength of the $WO_3$ film is caused by the increase of the adhesion to substrate of $WO_3$ molecules. However, the transparency of the $WO_3$ film is reduced when the substrate is held above 450° C. during the formation of the $WO_3$ film. This is because the optical density of the $WO_3$ film is increased when the substrate is held at a considerably high temperature during the formation of the $WO_3$ film.

EXAMPLE I

The display electrode comprising the $In_2O_3$ film is formed on a glass plate of 1 mm thickness in a desired configuration through the use of a mask evaporation method. The thus formed glass plate is held at 350° C., and the $WO_3$ film is formed on the display electrode to 5000A thickness through the use of a thermal evaporation method. The evaporation source is tungsten trioxide powder manufactured by Mitsuwa Chemical Co. Ltd. The thus formed display electrode shows the transparency of 80 through 85% in the air.

The liquid electrolyte comprises GR:lithium perchlorate and 1.0 M/l E.P.γ-Butyrolactone both manufactured by Kishida Chemical Co. Ltd. Al$_2$O$_3$ powder, for example, "CR-0.3 μm" manufactured by Mellar Co. Ltd., is added to the liquid electrolyte to 20 vol% to provide the white background. The conductivity is $7.8 \times 10^{-3}$ ·cm$^{-1}$ at 25° C. The E.P.γ-Butyrolactone is twice distilled in the vacuum of 12 mmHg.

The thus formed liquid electrolyte is added to the electrochromic display cell under the conditions of $-20°$ C. and 0.1 mmHg. The injection opening is sealed by the glass plate and the epoxy resin, for example, "CS-2340-5" manufactured by Cemedin Co. Ltd. Air bubbles are preferably formed in the liquid electrolyte by 10 vol% to absorb the thermal expansion of the liquid electrolyte.

A preferred reference electrode potential $V_S$ is 1.0 V which produces the contrast ratio 10:1 against the wavelength of 590 nm in 0.5 l seconds. The bleaching operation is completed in 0.2 seconds when the reference electrode potential $V_S$ is maintained at $-1.5$ V. The aging test is conducted by the cycle comprising the write-in by 0.5 seconds through the use of 1.0 V $V_S$, the memory period for 0.5 seconds, and the bleaching by 1.0 second through the use of $-1.5$ V $V_S$. The test results are as follows:

(1) after 10 days or 400000 cycles at 55° C., the contrast ratio is 17:1
(2) after 90 days or 3800000 cycles at room temperature, the contrast ratio is 10:1

The above constructed ECD cell is maintained at 80° C. for 1000 hours without dissolution of the WO$_3$ film and the deterioration of the liquid electrolyte.

EXAMPLE II

The WO$_3$ film is formed under the condition where the substrate is held at 400° C. The remainings are similar to that of EXAMPLE I. The transparency of the display electrode is 78 through 85%. The liquid electrolyte comprises γ-Butyrolactone and 0.75 M/l lithium perchlorate. The Al$_2$O$_3$ powder is added by 20 vol%. The conductivity of the thus formed liquid electrolyte is $8.0 \times 10^{-3}$ ·cm$^{-1}$. The electrochromic display cell of EXAMPLE II shows similar characteristics to the cell of EXAMPLE I.

EXAMPLE III

The WO$_3$ film is formed under the condition where the substrate is held at 250° C. The remainings are similar to that of EXAMPLES I and II. The transparency of the display electrode is 82 through 85%. The liquid electrolyte comprises γ-Butyrolactone and 1.0 M/l NaClO$_4$ (Manufactured by Kishida Chemical Co. Ltd.). The Al$_2$O$_3$ powder is added by 20 vol%. The conductivity of the thus formed liquid electrolyte is $7.5 \times 10^{-3}$ ·cm$^{-1}$. The electrochromic display cell of EXAMPLE III shows similar characteristics to the cell of EXAMPLE I.

EXAMPLE IV

The display electrode is the same one as that of EXAMPLE III. The liquid electrolyte comprises the γ-Butyrolactone and 0.8 M/l lithium tetrafluoroborate (manufactured by Kishida Chemical Co. Ltd.). The Al$_2$O$_3$ powder is added to produce the white background. The conductivity of the thus formed liquid electrolyte is $6.5 \times 10^{-3}$ ·cm$^{-1}$. The electrochromic display cell of EXAMPLE IV shows similar characteristics to the cell of EXAMPLE I.

The invention being thus described, it will be obvious that the same may be varied in may ways. Such variations are not to be regarded as a departure from the spirit and scope of the invention, and all such modificatins are intended to be included within the scope of the following claims.

What is claimed is:

1. An electrochromic display cell comprising two substrates defining the electrochromic display cell, a display electrode formed on one of said two substrates, an electrochromic layer formed on said display electrode, and a liquid electrolyte disposed between said two substrates, wherein
    said liquid electrolyte comprises γ-Butyrolactone and lithium perchlorate, and
    said electrochromic layer comprises a transition metal oxide film not soluble in said liquid electrolyte, said transition metal oxide film being formed on said display electrode under the condition where said one of the two substrates is held at a temperature between 250° C. and 400° C.

2. The electrochromic display cell of claim 1, wherein said transition metal oxide film comprises a tungsten oxide film.

3. The electrochromic display cell of claim 2, wherein said tungsten oxide film is formed through the use of a vacuum deposition method.

4. An electrochromic display cell comprising two substrates defining the electrochromic display cell, a display electrode formed on one of said two substrates, an electrochromic layer formed on said display electrode, and a liquid electrolyte disposed between said two substrates, wherein
    said liquid electrolyte comprises γ-Butyrolactone and sodium perchlorate, and
    said electrochromic layer comprises a transition metal oxide film not soluble in said liquid electrolyte, said transition metal oxide film being formed on said display electrode under the condition where said one of the two substrates is held at a temperature between 250° C. and 400° C.

5. The electrochromic display cell of claim 4, wherein said transition metal oxide film comprises a tungsten oxide film.

6. The electrochromic display cell of claim 5, wherein said tungsten oxide film is formed through the use of a vacuum deposition method.

7. An electrochromic display cell comprising two substrates defining the electrochromic display cell, a display electrode formed on one of said two substrates, an electrochromic layer formed on said display electrode, and a liquid electrolyte disposed between said two substrates, wherein
    said liquid electrolyte comprises γ-Butyrolactone and lithium tetrafluoroborate, and
    said electrochromic layer comprises a transition metal oxide film not soluble in said liquid electrolyte, said transition metal oxide film being formed on said display electrode under the condition where said one of two substrates is held at a temperature between 250° C. and 400° C.

8. The electrochromic display cell of claim 7, wherein said transition metal oxide film comprises a tungsten oxide film.

9. The electrochromic display cell of claim 8, wherein said tungsten oxide film is formed through the use of a vacuum deposition method.